Aug. 24, 1954  J. R. RICHARDS  2,686,911
CLINCHER MECHANISM FOR NAILING MACHINES
Filed March 28, 1952  7 Sheets-Sheet 1

INVENTOR
JOHN R. RICHARDS
BY Hans G. Hoffmeister
ATTORNEY

Aug. 24, 1954   J. R. RICHARDS   2,686,911
CLINCHER MECHANISM FOR NAILING MACHINES
Filed March 28, 1952   7 Sheets-Sheet 2

INVENTOR
JOHN R. RICHARDS
BY Hans G. Hoffmeister
ATTORNEY

Aug. 24, 1954   J. R. RICHARDS   2,686,911
CLINCHER MECHANISM FOR NAILING MACHINES
Filed March 28, 1952   7 Sheets-Sheet 5

INVENTOR
JOHN R. RICHARDS
BY
ATTORNEY

Aug. 24, 1954   J. R. RICHARDS   2,686,911
CLINCHER MECHANISM FOR NAILING MACHINES
Filed March 28, 1952
7 Sheets-Sheet 6

INVENTOR
JOHN R. RICHARDS
BY Hans G. Hoffmeister
ATTORNEY

Patented Aug. 24, 1954

2,686,911

UNITED STATES PATENT OFFICE 2,686,911

CLINCHER MECHANISM FOR NAILING MACHINES

John R. Richards, Riverside, Calif., assignor to Food Machinery and Chemical Corporation, San Jose, Calif., a corporation of Delaware Application March 28, 1952, Serial No. 279,013

24 Claims. (Cl. 1—15)

1

The present invention relates to machines adapted to nail flatly superposed slats, boards or planks together. Machines of this type are commonly employed to produce the side walls, or lids of cases, crates and the like. When nails are driven through flatly superposed slats, such as is the case when several juxtaposed slats are joined into the lid or side wall of a case by nailing a common board across them, the points of the nails may protrude from the underside of the slats, which renders the cases dangerous to handle and impairs their useability. For this reason it is necessary to clinch the projecting nail points which has the added advantage of increasing the sturdiness of the structure joined by the nails.

It is an object of the present invention to provide a nailing machine of the type referred to, that is operable to clinch the points of nails driven through the work.

Another object is to provide a nail point clincher for nailing machines, of the type referred to, that is simple in construction yet effective, fast and dependable in operation.

Still another object is to provide a clincher mechanism, of the type referred to, that may readily be installed in, and operatively connected to the power train of, nailing machines of conventional design.

An additional object is to provide nailing machines of the type referred to with a clincher mechanism that is effective to clinch the point of nails driven through boards or planks without extending the period of time required by the nailing machine for each nailing stroke.

Yet another object is to provide a nailing machine with a clincher mechanism that operates simultaneously with the nailing operation, such that the clinching operation is completed by the time the nail or nails have bten driven fully through the slats or boards to be joined.

A further object is to provide a simple and effective actuating arrangement for nail point clincher mechanisms of the type referred to.

Moreover, it is an object to provide, in nailing machines of the type referred to, a clincher actuating mechanism that is effective to drive the clincher from the same source of power as, and in timed relation with, the actual nailing mechanism of the machine.

These and other objects of the present invention will be apparent from the accompanying drawings which illustrate a preferred embodiment thereof and wherein:

Fig. 1 is a side elevation of a nailing machine

2 embodying the clincher mechanism of the invention.

Fig. 4 is a fragmentary plan view illustrating a detail of the mechanism shown in Fig. 3, viewed in the direction of the arrows 4—4 in Fig. 1.

Figures 1, 4:
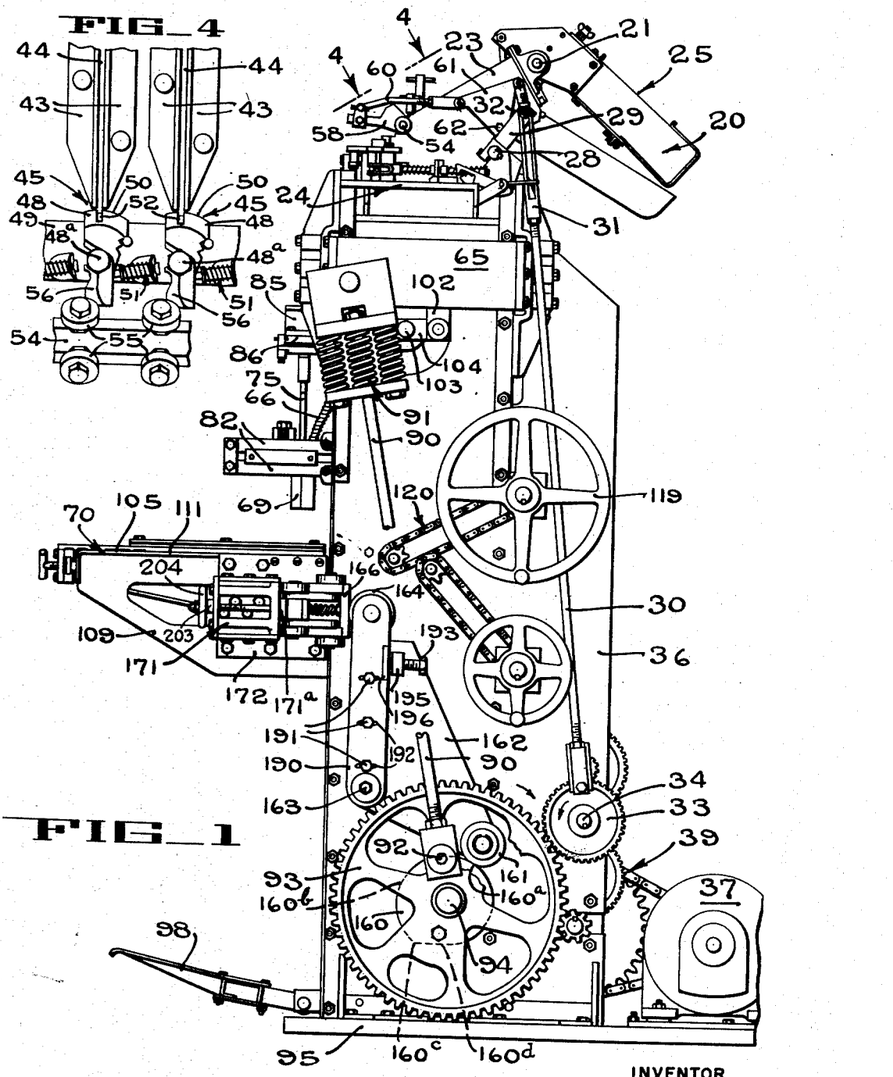
Figure 2A:
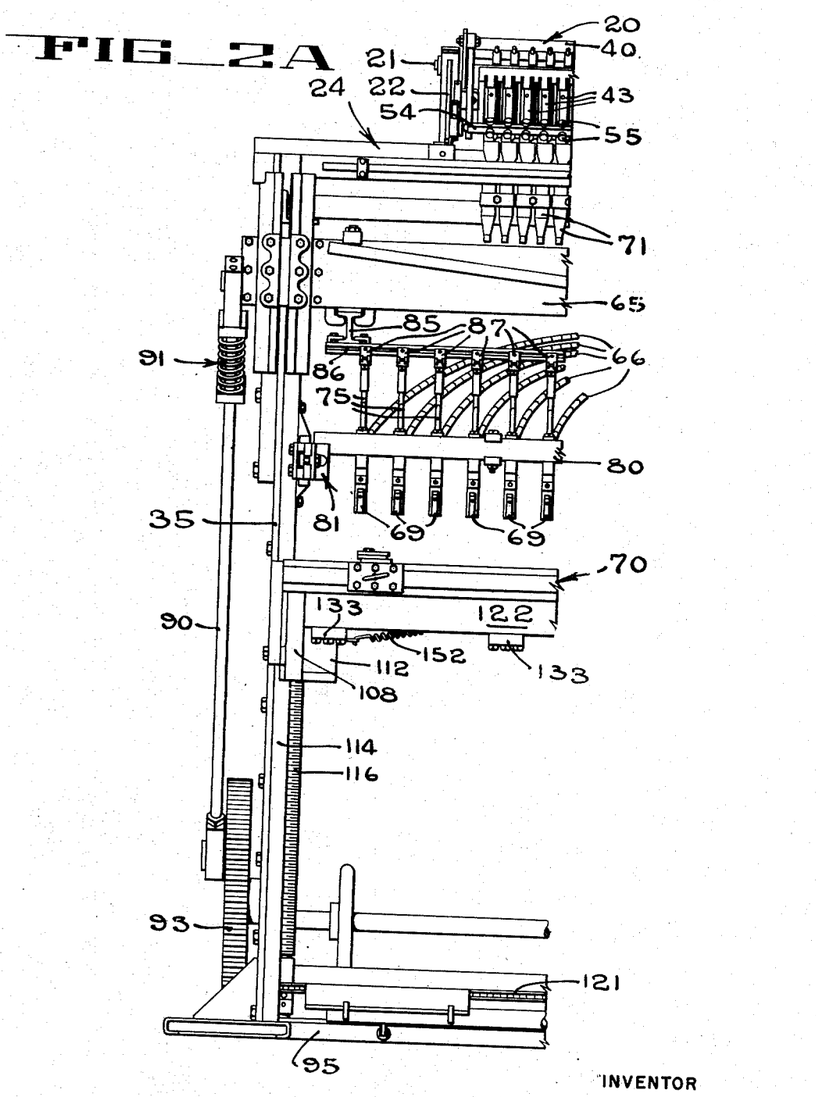
Figs. 2A and 2B are the left and right half, respectively, of a front elevation of the machine illustrated in Fig. 1 with certain parts broken away to expose details of the clincher mechanism.
Figure 2B:
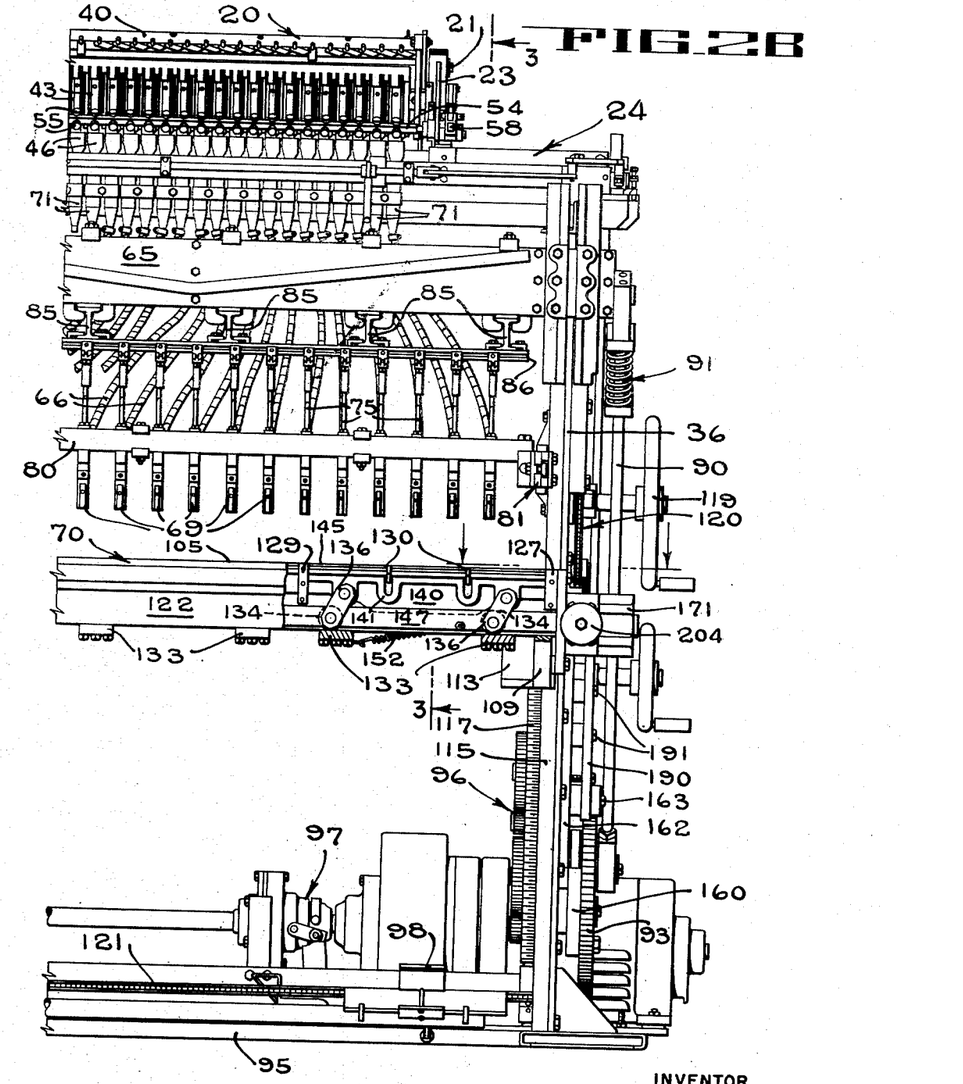

Having first reference to Figs. 1, 2A and 2B, the exemplary nailing machine to which the clincher mechanism of the invention is applied comprises briefly a nail supply pan or hopper 20 that is pivotally supported at 21 from transversely spaced parallel vertical panels 22 and 23 mounted on top of the machine frame 24, and into which nails are deposited at random through the opening 25. During operation of the machine, the hopper 20 is continually oscillated about its pivot point 21 from the rearwardly declined position shown in Fig. 1 to the forwardly tilted position shown in Fig. 3. For this purpose, an L-shaped link 26 (Fig. 3) may pivotally connect the front or discharge end of the hopper 20 to an arm 27 that is firmly mounted upon a transverse shaft 28 which is suitably journaled in the above mentioned side panels 22 and 23. Firmly secured to said shaft 28 is a rearwardly extending arm 29 (Fig. 1) that is continually rocked in clockwise direction by a pitman 30 which has a slotted upper end 31 that is engaged over a stud 32 which projects laterally from said arm 29. The lower end of the pitman 30 is pivoted to a crank disc 33 that is mounted upon a transverse shaft 34 which is suitably journaled in the side frame 36 of the machine. During operation of the machine a suitable source of rotary power, such as the electric motor 37, maintains said shaft 34 in a continuous state of rotation through a suitable train of gears and sprockets collectively identified by the reference numeral 38. In Fig. 1 the pitman 30 is shown in its elevated position in which it permits the hopper 20 to drop under its own weight and under the weight of the nails contained therein into the rearwardly declined position illustrated in said figure, from which it is raised into its forwardly tilted position (Fig. 3) as rotation of the crank disc 33 pulls the pitman 30 into its lowermost position. When the hopper 20 is in said last mentioned position, the nails contained therein gravitate toward the discharge end thereof. Formed in the floor of the hopper 20 near the discharge end thereof are many longitudinal channels (not visible) through which the stems of the nails may drop, but which are of such limited transverse width as to retain the heads of the nails above the hopper floor. Hence, when the hopper 20 is in the forwardly tilted position shown in Fig. 3, nails will drop with their stems through said channels but their heads will be retained in the hopper, and the nails will therefore gravitate along said channels toward the discharge end of the hopper. Arranged across the discharge end of the hopper 20 is a weir in the form of a transverse bar 40 (Figs. 2A and 2B), the lower edge of which is provided with recesses (not visible) one above each of the described channels, that are of such limited depth that only the heads of nails hanging through said channels may pass underneath the weir, while the bulk of the nails in the hopper is retained therein. Beyond the weir 40, transversely spaced, downwardly inclined angle bars 43 that are rigidly supported from the side panels 22 and 23 in a suitable manner, form continuations 44 of the aforementioned nail guiding channels in the floor of the hopper 20. Within and along said channel continuations 44 the nails passed by the weir 40 gravitate in orderly single file lines toward the lower ends thereof, where gate mechanisms 45, commonly known as nail picks, are provided that normally block the flow of nails from said channels 44 but open briefly during each operating stroke of the nailing machine to permit a single nail to drop from each channel 44 into a funnel 46 disposed underneath to replace the nails used up in said operating stroke. Having reference to Figs. 3 and 4, each of said nail picks 45 may comprise a rotor segment 48 that is pivoted to a crossbar 49 supported from the hereinbefore mentioned side panels 22 and 23 and which presents a beveled arcuate edge 50 to the end of its respective nail guiding channel 44, suitable spring means 51 being provided to yieldably hold said segment 48 in a rotary position wherein a recess 52 provided in its beveled edge 50 and adapted to receive a single nail is aligned with its respective channel 44 such that the foremost one of the nails gravitating down said channels will leave said channel and come to rest within said recess. Whenever the nailing machine performs a nailing stroke that uses up a set of nails, means enter into operation that turn the rotor segments 48 temporarily about their pivot points 48a such that the single nails held in the recesses 52 may slide down the beveled upper surface thereof and drop from the rotor segments 48 into the funnels 46 below, while the portions of said rotor segments adjoining said recesses block the respective nail supplying channels 44, whereupon the rotor segments 48 return to their initial position under the urgency of the spring means 51 to receive another set of nails within their recesses 52. Having again reference to Figs. 3 and 4, a transverse shaft 54 suitably journaled in the side panels 22 and 23 may be arranged to carry a sequence of rollers 55 for each rotor segment 48 provided in the machine. Upon rotation of said shaft 54, coincident with an operating stroke of the nailing machine said rollers 55 engage temporarily a suitable camming surface 56 provided on their respective rotor segments 48 to turn said rotor segments in the manner described above against the urgency of their restore springs 51. To turn the shaft 54 over an arc effective to release a single nail through each gate mechanism 45, whenever the machine performs a nailing stroke, said shaft 54 may carry on one of its ends a ratchet 57 (Figs. 1, 2B and 3) which is engaged by an actuating pawl 58. Said actuating pawl 58 is pivoted to a link 60 that in turn is pivoted to one end of a bell crank 61 which is pivotally supported from the side panel 23, as shown at 62 in Figs. 1 and 3. The other end of said bell crank 61 is pivotally connected to a link 63 which in turn is pivotally connected to a lug 64 projecting rearwardly from a rectangular frame 65, that is arranged to slide vertically upon and along the side frames 35 and 36 of the machine. The rectangular frame 65 actuates the means that drives the nails through the boards to be joined as will be presently described in greater detail. Thus, whenever the rectangular slide 65 is lowered to drive a set of nails into the work to be joined, the pawl 58 is actuated to turn the cam shaft 54 over an arc that will release a single nail from every one of the gate mechanisms 45.

Figure 5:
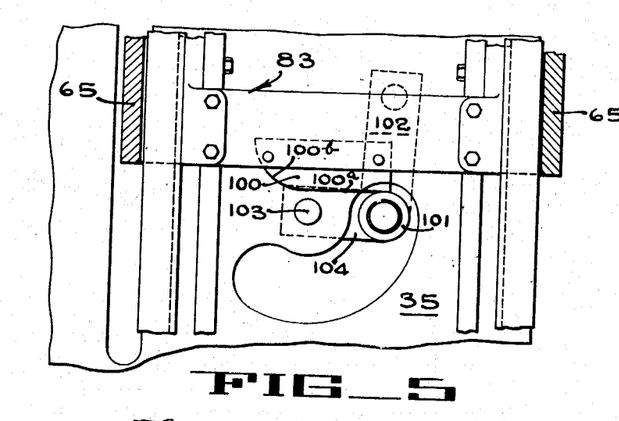
Figs. 5 and 6 are fragmentary side elevations illustrating another component mechanism of the nailing machine in different operational positions.

The nail receiving funnels 46 disposed below the gate mechanisms 45 are stationary being rigidly supported in a suitable manner from the top of the machine frame, and they guide the nails received from the gate mechanisms 45 through flexible tubular conduits 66 into nail chucks 69 that bring the nails into proper position above the work for the actual nail driving or punching operation. For this purpose, said nail chucks may be arranged to descend from a level a predetermined distance above a work supporting table or anvil 70 arranged in front of the machine into contact with the work that may lie on said anvil. To permit the flexible conduits 66 to move with the nail chucks 69 without impairment of their task of guiding the nails from the nail picks swiftly and without obstruction to said nail chucks, the upper ends of said conduits may be provided with additional funnels 71 that are suitably supported from and move with the hereinbefore described slide 65 and which telescope over the elongated tubular extensions 72 of the previously described stationary nail receiving funnels 46. The nail chucks 69 may be formed by blocks 73 having vertical channels 74 adapted to slidably receive the rods 75 that actually drive the nails into the work and which are commonly known as nail punches. In the exemplary embodiment of the machine illustrated in the accompanying drawings each nail chuck 69 with its channel 74 is formed by two block sections 73a and 73b (Fig. 3A) that are held together by a strong spring brace 76 which may permit said block sections to slide apart, should the punch 75 encounter an obstruction within the channel 74 such as may be formed by an inappropriately positioned nail. The hereinbefore described nail supplying conduits 66 are each connected to an inclined lateral passage 77 provided in the block section 73b so that nails sliding down through the conduits 66 enter the vertical channel 74 in lateral direction. At its lower end each of the chuck blocks 73 is provided a spring jaw 78 which is arranged to engage the point of a nail supplied through the channel 74 and to yieldably retain said nail within the chuck. Said jaw 78 may be formed by a pair of leaf springs 78a and 78b that are supported within the slotted lower end of each block 73 in the manner of a V converging below the bottom end of the channel 74. All nail chucks 69 provided in the machine are adjustably supported from a crossbar 80. At its opposite ends said crossbar is supported from brackets 81 (Figs. 2A and 2B) which slide within guide grooves formed by vertically spaced horizontal guide bars 82 (Fig 1), but are secured in adjusted position relatively to said guide bars during operation of the machine. Said guide bars in turn are part of a carriage 83 (Figs. 5 and 6) that slidably engages the side frames 35 and 36 of the machine below the hereinbefore described rectangular slide 65 and which is operatively coupled for limited reciprocatory vertical movement with the hereinbefore mentioned slide 65 in a manner to be presently described.

Supported from and below the rectangular frame of the slide 65 for adjustment longitudinally of the machine is a plurality of horizontally positioned parallel beams 85 that extend longitudinally of the machine, and suitably supported from the front end of said beams is a transversely extending bridge member 86. On its underside said bridge member 86 carries a plurality of transversely spaced parallel racks 87 from which are suspended the hereinbefore mentioned rod shaped nail punches 75, one for each of the nail chucks 69 provided in the machine. The upper ends of said rod shaped punches 75 are radially extended in the manner of a T to form flat upper surfaces that face the underside of the bridge member 86 and which are positively engaged by said bridge member during descent of the rectangular frame 65 as soon as the lower ends of the punches encounter resistance such as is the case when they engage the heads of nails within the chucks. To actuate the slide 65 pitmans 90 (Fig. 1) pivotally connect said slide through suitable shock absorbers 91 to aligned eccentric points 92 of crank wheels 93 that are mounted upon the opposite ends of a transverse shaft 94 suitably journaled in the side frames 35, 36 of the machine near the pedestal 95 thereof. Said shaft 94 may be driven from the aforementioned electric motor 37 through a suitable power train, collectively identified as 96 in Fig. 2B which includes a single revolution clutch 97 that may be engaged by depression of a suitable pedal switch 98 disposed in front of the machine (Fig. 1). As pointed out hereinbefore, the electric motor is in a continuous state of rotation during operation of the machine and by depression of the pedal switch 98 the power of said motor is applied to the crank wheels 93 for the time of a single revolution thereof.

Figure 6:
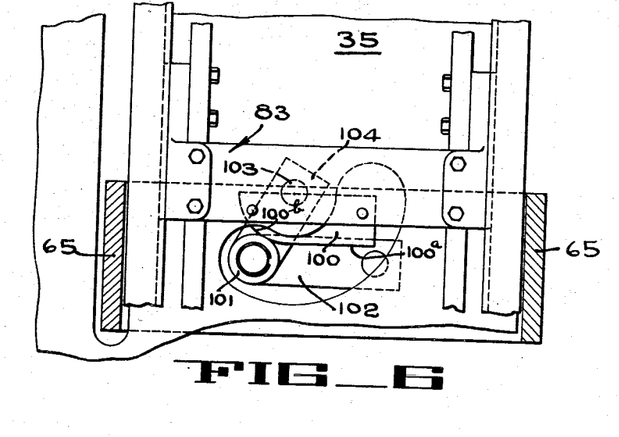

When the nailing machine is in its position of rest, both, the nailing punches 75 and the nail chucks 69, are raised sufficiently high above the table or anvil 70 to permit the work to be placed thereon, with the punches sufficiently withdrawn from their respective chucks to provide space in the channels 74 for a nail to rest itself with its point upon the converging end of the spring jaws 78 of the chucks. During the nailing operation, however, the nail punches 75 must be arranged to descend at a faster rate than the nail chucks and to a level somewhat lower than the lowermost level reached by said chucks in order that they may drive the nails from the chucks into the work once the chucks have come to a halt above the work. Referring again to Fig. 1, said figure illustrates the initial or full cycle position of the actuating mechanism for the rectangular slide 65, wherein the crank wheels 93 hold the pitmans 90 and hence the slide 65 and the nail punches 75 at their highest position. When the nail punch supporting slide 65 is in the defined elevated position, it is arranged to positively hold the nail chuck supporting carriage 83 in a sufficiently elevated position to raise the chucks 69 above the anvil 70. For this purpose, the opposite sides of the carriage 83 may be provided with ledges 100 (Fig. 5) that rest upon studs 101 which project from links 102 that are pivotally secured to the sides of the slide 65 at points which lie above the level of the ledges 100 when said slide is in its extreme elevated position. Upon depression of the pedal switch 98 the crank wheels 93 commence to turn in clockwise direction as viewed in Fig. 1 causing the pitmans 90 to lower the slide 65. As said slide descends to lower levels, it also lowers the studs 101 and thus permits the carriage 83 supported on said studs to drop to lower levels under the force of its own weight. The carriage-supporting studs 101, however, are also pivotally supported from the adjacent stationary side frames 35 and 36, respectively, at points 103 by means of second links 104 of predetermined length. As a result of the described connection the carriage supporting studs 101, instead of dropping along a vertical line, will describe an arc and slide along the bottom edges 100a of their respective ledges 100 limiting the descent of the carriage 83 to a drop equal to the distance between the stationary pivot points 103 and the center axis of the studs 101 (Fig. 6). In the exemplary mechanism illustrated in Figs. 5 and 6, the drop of the carriage 83 is somewhat increased beyond the defined distance by arcuately beveling the front edges 100b of the ledges 100 such that said ledges may actually drop a limited distance below the summit of their supporting studs 101.

By interposing a lost motion linkage of the type here described between the slide 65 and the carriage 83, the former controls the descent and also the return movement of the latter such that with every revolution of the crank wheels 93 the slide 65 will descend at a faster rate and over a greater distance, and vice versa, will rise at a faster rate and over a greater distance than the carriage 83. In this manner the nail punches 75 will be sufficiently withdrawn from their chucks at the beginning of each operational cycle of the machine to unblock the nail feeding passages 77 and leave space for nails in the chuck channels 74, but will upon commencement of each nailing operation progressively enter the simultaneously descending nail chuck, and eventually engage the heads of the nails within the chucks as said chucks come to rest upon the work. The punches will then push the nails through the yielding jaws 78 into the work on the anvil 70 underneath, reaching their lowermost position when the crank wheels 93 have made half a revolution. Thereafter continued rotation of said crank wheels will raise the punches 75 within the chucks 69, and then raise both the punches and the chucks until both reach their initial full cycle position, with the former almost withdrawn from the latter as illustrated in Figs. 1 and 3.

The operation of the described nailing machine may be briefly recapitulated as follows:

A work piece, such as two flatly superposed boards, is placed in the proper position on the anvil 70 with the area where the boards are to be joined disposed below the nail chucks 69. When the machine is in use, the motor 37 is in continuous operation and the crank disc 33, therefore, oscillates the hopper 20 continually between the reclined position shown in Fig. 1 to the forwardly tilted position shown in Fig. 3. Whenever the hopper 20 is in the latter position nails will fill the guide channels provided in the forward portion of its bottom and will gravitate in orderly single file underneath the weir bar 43 onto the declined channel continuations 44, with the foremost nail in each file coming to rest within the recess 52 of the nail pick mechanism 45 provided at the lower end of each channel.

Figure 3:
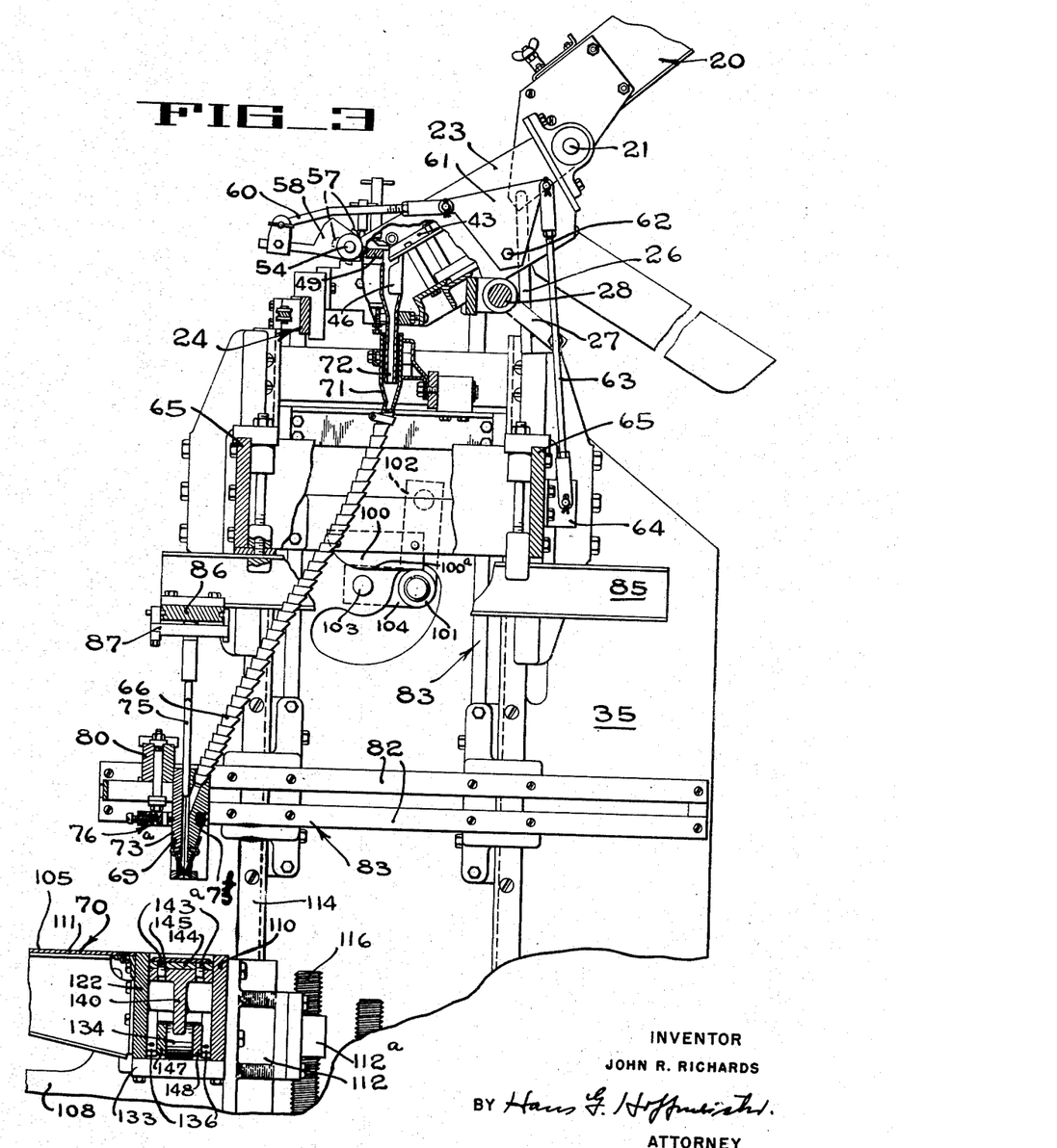
Fig. 3 is a fragmentary vertical section through the nailing machine taken along line 3—3 of Fig. 2B and viewed in the direction of the arrows associated with said line.
Figure 3A:
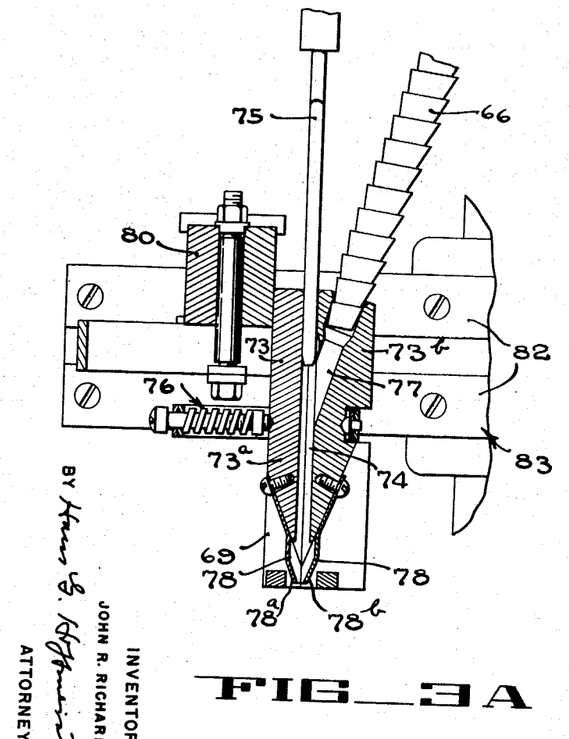
Fig. 3A is an enlarged detail view of a component of the structure shown in Fig. 3.

To illustrate a preferred form of cooperation between the nail pick mechanism and the actual nailing mechanism of the described machine, let it be assumed that the nail picks have already passed a nail each and delivered it through the flexible conduits 66 into a respective chuck 69, where it enters the center channel thereof since the nail punches are in their upwardly withdrawn full cycle position illustrated in Fig. 3 in which the side passages 77 are unblocked. Each of the nail chucks 69, therefore, contains a nail that rests with its point upon the yieldable jaw 78.

To set the actual nailing mechanisms into operation, the operator steps on the pedal switch 98 which connects the crank wheels 93 for a single revolution to the power train of the continuously operating motor 37. As the crank wheels commence to turn in clockwise direction as viewed in Fig. 1, they pull the rectangular slide 65 downwardly which lowers the punches 75 supported therefrom upon the work piece on anvil 70. Descent of the slide 65 releases the carriage 83 which drops under its own weight and the weight of the assembly carried therefrom at a rate controlled by the hereinbefore described lost motion linkage 102/104 until the nail chucks supported from said carriage come to rest upon the work piece on the anvil. The descent of the slide 65, however, continues under the pull of the pitmans 90, and the punches 75 therefore push deeper into the chucks, engage the heads of the nails contained therein and push the nails through and past the yielding spring jaws out of the chucks and fully into the work to be joined.

As the rectangular slide 65 is pulled downwards in the described manner, it pulls the link 63 that is pivotally connected to the lug 64 on its rear wall as described hereinbefore. As a result thereof, the bell crank 61 is rocked in clockwise direction as viewed in Figs. 1 and 3 which actuates the pawl 58 to rotate the shaft 54 that carries sets of nail pick actuating rollers 55 for each of the nail guiding channels 44 as explained hereinbefore. The described actuation of pawl 58 turns said shaft 54 over an arc that brings one of said rollers 55 in each set briefly into engagement with the camming surface 56 of each rotor segment 48 causing the rotor segments to swing briefly sidewise and deposit the solitary nails in their recesses 52 into the funnels 46 underneath which deliver them through the flexible conduits 66 into the side passages 77 of the various nail chucks 69. At this moment, however, the punches are fully inserted into the chuck channels 74 so that the nails are blocked from entrance into said channels and remain in the side passages 77 of the chucks. After completion of the nailing stroke, however, during the second and final half of the single revolution of the crank wheels 93, the slide 65 is raised to its initial position which withdraws the punches 75 from the work. The return movement of the slide 65 is also effective to raise the carriage 83 from which the chucks 69 are supported. However, the return movement of said carriage 83 occurs at a slower rate and is limited to a shorter distance than the return movement of the slide 65 due to the described lost motion linkage 102/104 that couples the carriage to the slide. As a result thereof the punches 75 withdraw from the chucks 69 to the extent illustrated in Fig. 3 unblocking the side passages 77 thereof, so that the single nails retained in said side passages by the punches in their state of depression may now slide into the channels 74 and rest themselves with their points against the closed bite of the resilient jaws 78. Thus, by the time the crank wheels 93 have completed their revolution and slide 65 and carriage 83 have returned to their full cycle positions in which they hold the punches 75 and the chucks 69, respectively, a sufficient distance above the anvil 70 to permit handling of the work piece, the chucks 69 are already charged with a new set of nails so that the machine is immediately ready for another operational cycle.

The mechanism for clinching the points of nails driven through the work piece in the described nailing operation is located in the repeatedly mentioned anvil 70 in that the work supporting surface 105 of said anvil is arranged to contain a vertically retracted area, adjacent its inner transverse edge directly below the nail punches 75, which is normally situated at a somewhat lower level than the remaining anvil surface but is operable to rise temporarily to said level toward the end of each nailing stroke of the nail punches. Having reference to Figs. 1, 2A and 2B the anvil structure illustrated therein comprises a pair of transversely spaced consoles 108 and 109 which are connected at their inner ends by an edgewise positioned transverse plank 110 and which carry the anvil table 111. At the rear side of the plank 110 the consoles 108 and 109 form slide brackets 112 and 113 (Figs. 8 and 9) which embrace guide posts 114 and 115, respectively, that are suitably secured to the side frames 35 and 36 of the machine along the vertical front edges thereof. Said brackets 112 and 113 carry internally threaded loops 112a and 113a that are engaged by correspondingly threaded vertical rods 116 and 117 which rise vertically from the machine pedestal 95 (Figs. 2A and 2B) and are rotatably supported from the machine frame. By turning the vertical rods 116 and 117 the vertical position of the anvil consoles and hence of the anvil table may be varied and to this end a hand crank 119 arranged at the outside of the right hand side frame 36 (Fig. 1) may be operatively connected to the right hand rod 117 by a suitable power train which is collectively identified by the reference numeral 120 and which will usually include a worm gear transmission (not visible). At their lower ends the threaded rods 116 and 117 may be operatively connected for rotation in unison by a suitable sprocket train as indicated by the sprocket chain 121 that is visible in Figs. 2A and 2B. Thus, by turning the hand crank 119, the threaded rods 116 and 117 may both be rotated in unison, which is effective to raise or lower the total anvil depending upon the direction of operation of said rods.

Figure 7:
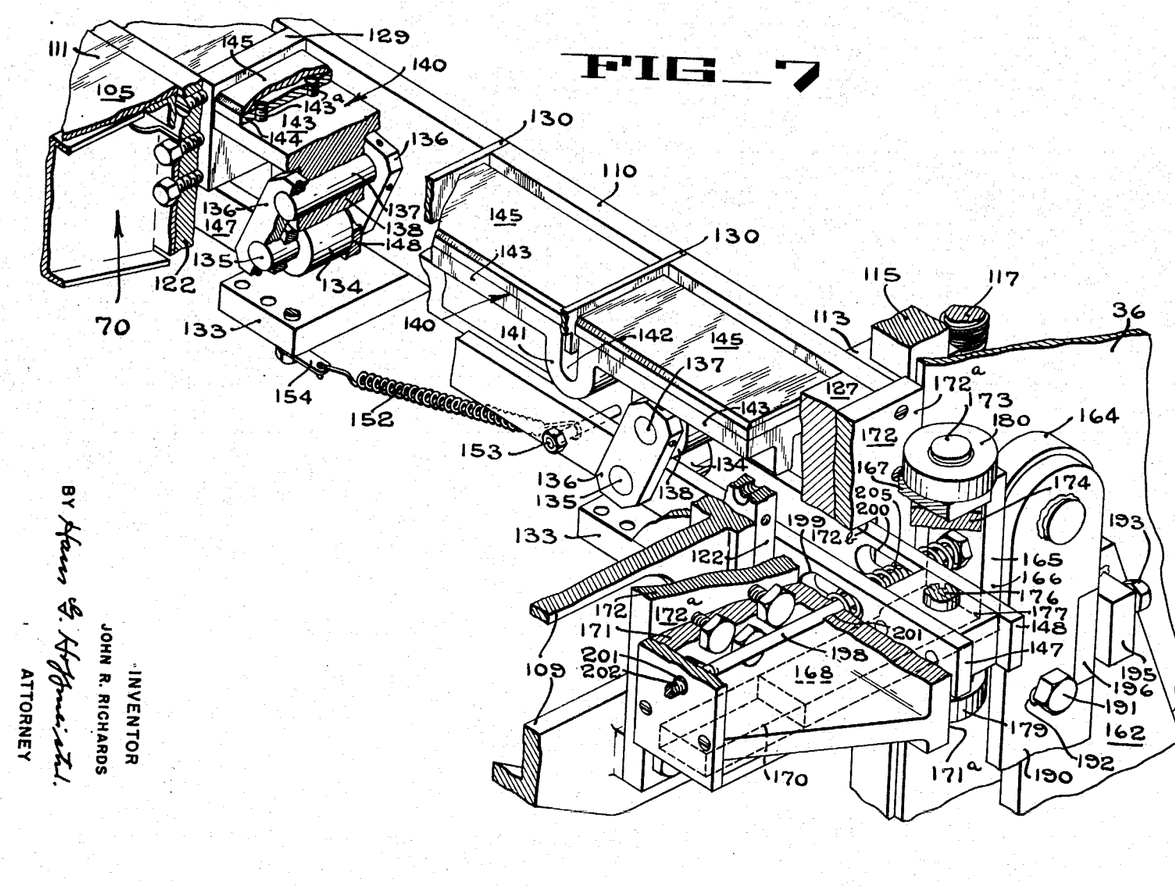
Fig. 7 is a fragmentary perspective of the clincher mechanism installed in the machine, viewed from a point in front, and to the right, of the machine as shown in Fig. 2B.
Figures 8, 9:
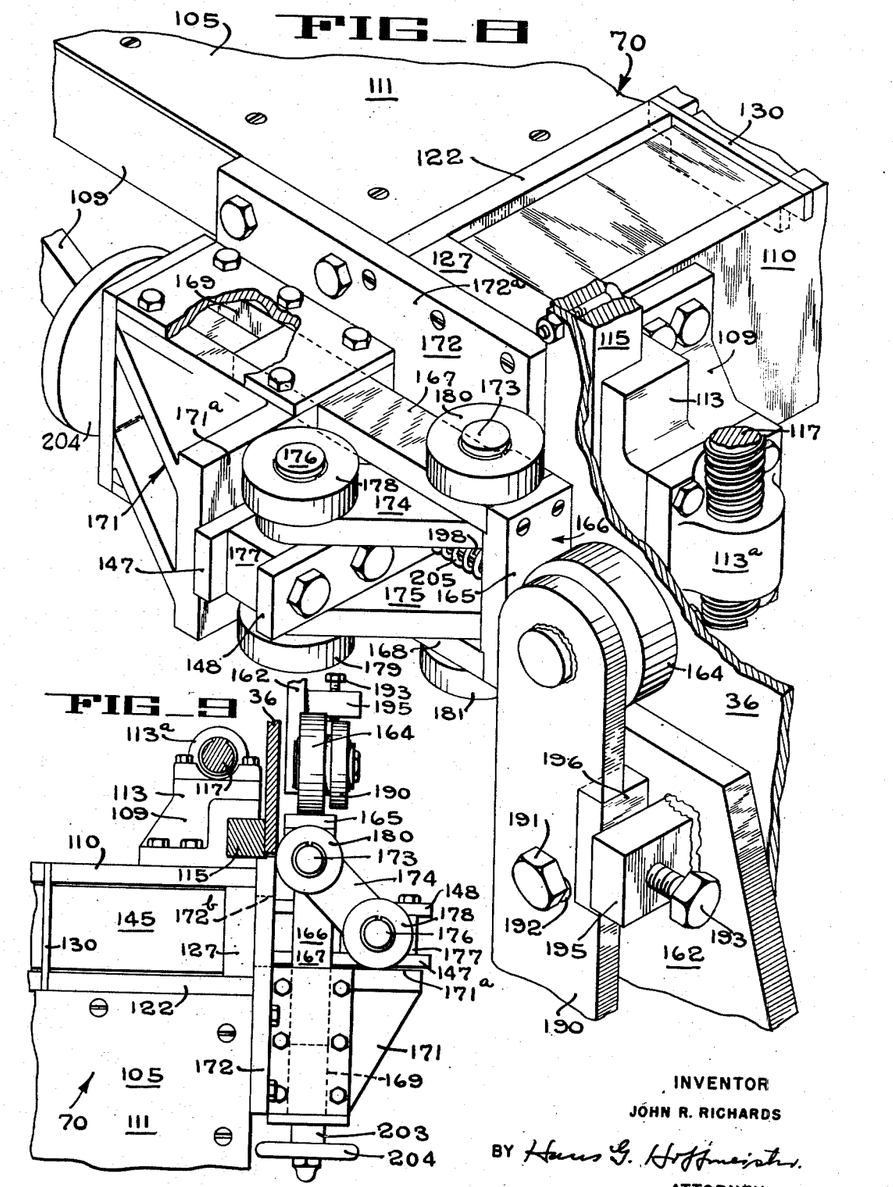
Fig. 8 is a fragmentary perspective of the actuating mechanism for the clincher mechanism illustrated in Fig. 7, viewed from a point to the right and rearwardly of the machine as shown in Fig. 2B.
Fig. 9 is a fragmentary plan view of said actuating mechanism.

Having specific reference to Figs. 3 and 9, in the anvil of the present invention the table plate 111 does not extend all the way to the transverse plank 110 at the rear end of the consoles 108 and 109 but terminates adjacent another edgewise positioned vertical plank 122 whose upper edge is flush with the work supporting surface of the table plate and which is supported from the consoles 108 and 109 in a position parallel to, and a short distance in front of, the first mentioned transverse plank 110. To securely maintain the planks 110 and 122 in their properly spaced relation, spacer blocks 127 may suitably be interposed between their ends and additional spacer blocks 129 may be interposed between intermediate points thereof. In addition, a number of spacer fillets 130 may be countersunk into the upper edges of the planks at equal intervals transversely of the anvil structure as best shown in Fig. 7. Bolted to the lower edges of the planks 110, 122 at intervals transversely of the machine are boards 133 that serve as supports for rollers 134 whose axes extend longitudinally of the machine and which turn on spindles 135. The ends of said spindles protruding from the opposite faces of said rollers 134 are held in the lower ends of parallel links 136 whose upper ends are connected by a hinge stud 137 that turns in a respective one of a plurality of apertured bosses 138 provided on the underside of a number of transversely juxtaposed base members 140 which lie between the planks 110 and 122. In a direction transversely of the anvil structure each of said base members fills one of the spaces between the spacer blocks 127 and 129, respectively, and to this end said base members 140 loop downwardly below each of the described spacer fillets 130 as best shown at 141 in Figs. 2B and 7 to provide guide grooves 142 within which the lower edges of said fillets are slidably received. Suitably secured to the intermediate portions 143 of said base members 140 such as by means of screw studs 143a projecting upwardly from said portions 143 are two vertically superposed horizontal plates 144 and 145 of rectangular conformation to fill the rectangular spaces defined by the planks 110, 122 and the fillets 130 or spacer blocks 127 and 129, respectively. The lower ones of said rectangular plates may be made from a relatively soft material, such as soft iron, but the upper ones 145 are preferably made of hardened steel, since they form the table area that is retracted below the actual work supporting surface 105 of the anvil as determined by its table plate 111 and the upper edges of the consoles 108, 109, the planks 110, 122, the spacer blocks 127, 129 and the fillets 130 when the machine is at rest. As previously pointed out said retracted area is temporarily elevated to a level flush with said surface, coincident with the final phase of each downward stroke of the nailing punches 75.

To effect this elevation of the rectangular plates 145 the projecting ends of the roller spindles 135 are engaged by and project through a pair of elongated draw bars 147 and 148 arranged at either side of the rollers 134 adjacent the end faces thereof. These draw bars extend from a point adjacent the left spacer block 127 transversely across the total length of the anvil structure with their right ends projecting laterally below the right spacer block 127 and beyond the right console 109. A number of strong springs 152 tensioned between studs 153 mounted in the draw bars and stationary points, such as eyes 154 secured to the roller supporting boards 133, normally urge said draw bars to the left as viewed in Figs. 2A, 2B and 7.

Since the base members 140 are unable to move in a direction transversely of the machine, due to the presence of the described spacer blocks and spacer fillets, any movement of the drawbars 147, 148 upon the rollers 134 under the force of the springs 152 causes the roller links 136 to assume a tilted position wherein they decline in leftward direction, as viewed in Fig. 7, and when so declined support the base members 140 in a position wherein the table plates 145 lie below the level of the remaining work supporting anvil surface 105. Means are provided, however, to pull the bars briefly to the right, and whenever this occurs the rollers 134 move to the right on their supporting boards 133, but with the base members 140 supported from said rollers unable to follow suit, due to the presence of the spacer blocks and spacer fillets, the links 136 assume a vertical position and raise the base members 140 to such an extent that the upper surfaces of the rectangular plates 145 are flush with the upper edges of the planks 110, 122, the spacer blocks 127, 129, the spacer fillets 130 and the anvil table 111.

To effect the described movement of the drawbars 147, 148 in proper synchronism with each downward stroke of the nail punches 75, a snail cam 160 (Fig. 1) may be secured to the right one of the hereinbefore described crank wheels 93 which actuate the nail punch carrying slide 65. The edge of said snail cam 160 is engaged by a roller 161 that is pivoted to one end of a bell crank 162 which may have the form of a triangular plate whose apex is rotatably supported from the right side frame 36 of the machine as indicated at 163. The other end of said bell crank 162 carries a camming roller 164 that is arranged to bear against the outer surface of the connecting bar 165 of a U-shaped bracket 166 (Fig. 7) whose parallel shanks 167 and 168 are slidably received within guideways 169 and 170 (Figs. 7 and 8) of corresponding size that are formed in a stationary casting 171 which is bolted to and projects laterally from the vertically positioned outer surface 172a of a mounting plate 172 that is bolted to the right console 109 and which has a suitable aperture 172b through which the right ends of the draw bars 147, 148 protrude. Said casting 171 forms a rearwardly directed vertical surface 171a adjacent to and in front of the laterally directed aperture 172b in the mounting plate 172. Rotatably secured to the shanks 167, 168 of the U-shaped bracket 166 by pivots 173 at points near the connecting bar 165 thereof, are the ends of a pair of parallel arms 174, 175, the opposite ends of which engage a vertical shaft 176 that is supported in a block 177 held between and bolted to the protruding ends of the drawbars 147, 148. The upwardly and downwardly projecting ends of the vertical shaft 176, carry rollers 178 and 179, respectively, that bear against the hereinbefore described rearwardly directed vertical surface 171a of the casting 171 and rollers 180 and 181 may be secured to the projecting ends of the pivots 173 by which the arms 174, 175 are secured to the shanks 167, 168 of the U-shaped bracket 166, to bear against the outer surface 172a of the mounting plate 172 and thus facilitate movement of said bracket along said plate.

When the machine is at rest with the bell crank 162 in the idle position illustrated in Fig. 1, in which its cam follower roller 161 engages a sector 160a of the snail cam 160 removed from the center point thereof by a minimum radius, the camming roller 164 is in its extreme clockwise position and the U-shaped bracket 166 is therefore free to withdraw from the casting 171 to an extent permitting the springs 152 to pull the drawbars 147, 148 into the extreme left position illustrated in Fig. 7, in which the rectangular table segments 145 are dropped below the work supporting surface 105 of the anvil. Under these conditions, the shaft 176 held between the outwardly protruding ends of the drawbars 147, 148 is drawn closest to the outer surface 172a of the mounting plate 172. However, whenever a nailing cycle is initiated by depression of the pedal switch 98 and the crank wheel 93 turns in clockwise direction as viewed in Fig. 1 and pulls the nail punches 75 downwardly to drive the nails from the chucks 69 into a work piece on the anvil 70 in the manner described hereinbefore, the cam follower roller 161 encounters cam points 160b of increasing radii, which is effective to swing the bell crank 162 in counterclockwise direction and bring its camming roller 164 against the connecting bar 165 of the U-shaped bracket 166 forcing said bracket to slide with its shanks 167, 168 deeper into the casting 171. However, the twin arms 174, 175 pivoted to said shanks bear with their rollers 178, 179 against the immovable outer surface 171a of the casting 171 and are therefore forced to swing in counterclockwise direction, with said rollers 178, 179 traveling along said surface 171a in a direction at right angles to and away from the surface 172a of the mounting plate 172. As a result thereof, the drawbars 147 and 148 and pulled outwardly against the force of the springs 152, and as they move to the right as viewed in Fig. 7, the twin links 136 are straightened from the tilted position illustrated in said Fig. 7 to an upright position which raises the table plates 145 to the level of the remaining anvil surface 105. This occurs as the crank wheel 93 to which the cam 160 is secured operates to lower the nail punches. Hence, as the table segments 145 are raised in the described manner, they engage any nail points that may appear on the underside of the work piece as the nail punches drive the nails positively through the work piece, and as a result thereof, the nail points are bent sidewards and finally backwards into the underside of the work piece. As soon as the effective stroke of the nail punches 75 has reached its maximum amplitude, however, corresponding to the lowest position to which the crank wheel 93 may pull the hereinbefore described nail punch carrying slide 65, the cam follower roller 161 on bell crank 162 drops from the maximum elevation 160c of the snail cam contour over a steep decline 160d onto the sector of minimum radius 160a, and as a result thereof, the bell crank 162 releases the U-shaped slide bracket 166. This permits the restore springs 152 to return the drawbars 147, 148 to their initial position and lower the table segments 145 below the remaining work supporting surface 105 of the anvil 70. Hence, by the time the nail driving mechanism has returned to its full cycle position, the clinching mechanism has likewise reached its initial position in which it is ready for another operational cycle of the nailing machine.

Means may be provided to adjust the effective amplitude of the clinching stroke. For this purpose, the camming roller 164 which engages the U-shaped slide bracket 166 may be pivoted to a bar 190 that is journaled on the pivot 163 of the bell crank 162 and is adjustably secured to said bell crank by means of screw bolts 191 which protrude through slotted apertures 192 in said bar, and a set screw 193 threadably received in an apertured ear 195 projecting laterally from the bell crank plate 162 may be arranged to engage a block 196 that is countersunk in the adjacent edge of the bar 190. Thus, when it is desired to increase the lift imparted to the table segments 145 by operation of the cam follower lever 162, the bolts 191 are loosened and the set screw 193 is turned to push the bar a limited distance in counterclockwise direction as viewed in Fig. 1 whereupon the bolts 191 are tightened again to firmly hold the bar 190 in its newly adjusted position. Vice versa, if it is desired to decrease the lift imparted to the retracted table segments 145, the bolts 191 are loosened and the set screw 193 is turned to withdraw from the bar 190, whereupon said bar is shifted in clockwise direction as viewed in Fig. 1 and the set screws are tightened again.

Means may also be provided to disable the described clinching mechanism in a position in which the table segments 145 are fully raised to the level of the remaining surface 105 of the anvil 70, such that said anvil presents an uninterrupted solid supporting surface to the work. For this purpose a rod 198 suitably anchored in the connecting link 165 of the U-shaped bracket 166 at the inner surface thereof may be arranged to extend through elongated slots 199 and 200 in the drawbars 147, 148, respectively, (Fig. 7) and suitable apertures 201 in the casting 171 to project from the front surface of said casting. Its forwardly projecting end may be threaded as shown at 202 to receive the internally threaded tubular hub 203 of a hand wheel 204 (Figs. 1 and 9). Thus, by turning said hand wheel in one direction the rod 198 may be pulled forwardly forcing the U-shaped slide bracket 166 with its shanks 167 and 168 into the casting 171 to a depth effective to hold the drawbars 147, 148 permanently in a position in which the table segments 145 are fully elevated and the slide bracket 166 itself is permanently out of reach of the camming roller 164 on the bell crank 162. On the other hand, a restore spring 205 coiled around the rear end of the rod 198 and interposed between the surface 171a of the casting 171 and the connecting link 165 of the bracket 166 is effective to advance said bracket within reach of the camming roller 164, whenever the hand wheel 204 is turned in the opposite direction, so that the table segments may drop below the level of the work supporting anvil surface 105 and the bracket 166 again be acted upon by the camming roller 164.

While I have explained my invention with the aid of an examplary embodiment thereof, it will be understood that I do not wish to be limited to the specific constructional details shown and described which may be departed from without departing from the scope and spirit of my invention.

I claim:

1. In a nailing machine having a descending nail punch, a nail point clinching anvil structure comprising a frame presenting a work supporting table surface, a supporting plate secured to said frame below the level of said work supporting table surface, a roller supported by said plate and constrained to move thereon along a rectilinear path in a direction parallel to said table surface, a member adapted to form a segment of said table surface below and in vertical alignment with the nail punch, a link pivotally supporting said member from said roller, means blocking movement of said member in a direction parallel to the defined rectilinear path, spring means urging said roller along said linear path into an extreme position, wherein said link is tilted and said member is accordingly held at a normally retracted position below the level of said table surface, and means operable coincident with the descent of the nail punch to advance said roller along said rectilinear path in the opposite direction to straighten said link and thus elevate said member to the level of said table surface.

2. In a nailing machine having a descending nail punch, a nail point clinching anvil structure comprising a frame forming a work supporting table surface containing an opening in alignment with the nail punch, a supporting plate secured to said frame at the lower end of said opening, a roller supported by said plate and constrained to move thereon along a rectilinear path in a direction parallel to said table surface, a member adapted to form a segment of said table surface disposed within said opening above said roller, a link pivotally supporting said member from said roller, spring means urging said roller along said linear path into an extreme position wherein said link is tilted and said member is accordingly held at a normally retracted position below the level of said table surface, and means operable coincident with the descent of the nail punch to advance said roller along said rectilinear path in the opposite direction to straighten said link and thus elevate said member to the level of said table surface.

3. An actuating mechanism for a nail point clincher of the type described comprising a member forming an immovable rearwardly directed surface, an actuating slide constrained to move in a direction perpendicular to said surface, a drawbar constrained to move parallel and adjacent to said rearwardly directed surface, a toggle link pivotally connecting the vicinal ends of said drawbar and said slide, a roller pivotally supported on the end of said toggle link adjacent said rearwardly directed surface to bear against said surface, means operable to move said slide in a direction toward said surface, and yieldable means effective to oppose endwise movement of said drawbar resulting from the defined movement of said slide.

4. An actuating mechanism for a nail point clincher of the type described comprising a member forming an immovable outer surface, an actuating slide received within a guideway formed in said member and extending inwardly from said outer surface thereof, a drawbar extending parallel and adjacent to said surface, a toggle link pivotally connecting the projecting end of said slide with the adjacent projecting end of said drawbar, a roller pivotally supported from the projecting end of said drawbar to bear against said outer surface, and means operable to force said slide into said guide way in a manner effective to impart endwise movement to said drawbar.

5. An actuating mechanism for a nail point clincher of the type described comprising a member forming an immovable outer vertical surface, an actuating slide received within a guideway formed in said member and extending inwardly from said outer vertical surface thereof, a drawbar extending parallel and adjacent to said surface, a link pivotally connecting the projecting end of said slide with the adjacent projecting end of said drawbar, a roller pivotally supported from the end of said toggle link adjacent to said outer vertical surface to bear against said surface, means operable to force said slide into said guide way, and spring means engaging said drawbar arranged to oppose endwise movement thereof resulting from operation of said last mentioned means.

6. An actuating mechanism for a nail point clincher of the type described comprising a member forming first and second immovable vertical outer surfaces arranged at right angles to each other, an actuating slide received within a guideway formed in said member and extending inwardly from said second outer surface thereof, with the projecting end of said slide disposed parallel and adjacent to said first surface, a drawbar disposed parallel and adjacent to said second surface, a link pivotally connecting the projecting end of said slide with said bar at the side of said slide remote from said first surface, a roller pivotally supported from the end of said link adjacent to said second surface to bear against said second surface, another roller pivotally supported from the projecting end of said slide to bear against said first surface; means operable to force said slide into said guideway, and spring means engaging said bar and arranged to oppose movement thereof resulting from the defined operation of said last mentioned means.

7. An actuating mechanism for a nail point clincher of the type referred to comprising a member forming an immovable vertical surface and a pair of superposed parallel guideways extending inwardly from said surface, a U-shaped bracket with its parallel shanks slidably received within said guideways, a drawbar extending parallel and adjacent to said surface intermediately of the shanks of said bracket, a vertical shaft supported from said drawbar, a pair of vertically superposed parallel links engaging said shaft and pivoted to respective shanks of said U-shaped bracket at points on the side of said drawbar remote from said surface, and rollers mounted upon said shaft adjacent to said links in contact with said surface.

8. An actuating mechanism for a nail point clincher of the type described comprising a member forming an immovable vertical surface and a pair of superposed parallel guideways extending inwardly from said surface, a U-shaped bracket with its parallel shanks slidably received within said guideways, a drawbar extending parallel and adjacent to said surface intermediately of the shanks of said bracket, a vertical shaft supported from said drawbar, a pair of vertically superposed parallel links engaging said shaft and pivoted to respective shanks of said U-shaped bracket at points on the side of said drawbar remote from said surface, rollers mounted upon said shaft adjacent to said links in contact with said surface, camming means operable to bear against the connecting bar of said U-shaped bracket to push said bracket with its parallel shanks deeper into said parallel guideways, and means manually adjustable to draw said bracket into said guideways to an extent removing it from the reach of said camming means.

9. A actuating mechanism for nail point clinchers of the type described comprising a member forming first and second immovable vertical surfaces disposed at right angles to each other and a pair of superposed parallel guideways extending inwardly from said second surface adjacent and in a direction parallel to said first surface, a U-shaped bracket disposed adjacent to said first surface with its parallel shanks slidably received within said guideways, a drawbar extending parallel and adjacent to said second surface intermediately of the shanks of said bracket, a vertical shaft supported from said drawbar on the side of said bracket remote from said first surface, a pair of vertically superposed parallel links engaging said shaft and pivoted to respective shanks of said U-shaped bracket at points on the side of said drawbar remote from said second surface, rollers pivotally supported from said shanks in contact with said first surface, rollers mounted upon said shaft in contact with said second surface, camming means operable to push said bracket with its parallel shanks deeper into said guideways, and spring means arranged to oppose the movement of said bracket and said drawbar resulting from the defined operation of said camming means.

10. In a nailing machine having a work supporting anvil and a nail punch arranged to descend upon said anvil and wherein said anvil contains a nail point clincher operated by a pull exerted in a direction transversely of the anvil; an actuating mechanism for said clincher mechanism comprising a member forming an immovable vertical outer surface projecting laterally from the side of the anvil, a drawbar operatively connected to the clincher mechanism and extending transversely of the anvil with one end disposed parallel and adjacent to said surface, an actuating slide received in a guideway formed in said member and extending inwardly from said outer surface, a link pivotally connecting the projecting ends of said bar and said slide, a roller pivotally supported at the end of said link adjacent to said vertical surface to bear against said surface, and means operable to force said slide into said guideway coincident with the descent of the nail punch.

11. In a nailing machine having a work supporting anvil and a nail punch arranged to descend upon said anvil and wherein said anvil contains a nail point clincher operated by a pull exerted in a direction transversely of the anvil, an actuating mechanism for the nail clincher comprising a member forming a first immovable vertical outer surface laterally adjacent a side of the anvil and a second immovable vertical outer surface projecting laterally from the side of the anvil at right angles to said first surface; a drawbar operatively connected to the clincher mechanism and extending transversely of the anvil with one end disposed parallel and adjacent to said second surface; an actuating slide received in a guideway formed in said member and extending inwardly from said second outer surface, with the projecting end of said slide extending parallel to and adjacent said first outer surface; a link pivotally connecting the projecting end of said slide to the projecting end of said bar; a roller pivotally supported at the end of said link adjacent to said second surface to bear against said second surface; a second roller pivotally supported from the projecting end of said slide to bear against said first surface; means operable to move said slide into said guideway coincident with the descent of the nail punch, thus forcing the projecting end of said bar in a direction away from said first surface; and spring means arranged to urge said bar into the opposite direction.

12. A nailing machine including a work supporting anvil; a nail punch arranged to descend upon said anvil; a nail point clincher mechanism contained in said anvil and operable by a pull exerted in a direction transversely of the anvil; an actuating mechanism for said nail clinching mechanism comprising a member forming an immovable vertical outer surface projecting laterally from a side of said anvil, a drawbar operatively connected to the clincher mechanism and extending transversely of the anvil with one end disposed parallel and adjacent to said surface, an actuating slide received in a guideway formed in said member and extending inwardly from said outer surface thereof, a link pivotally connecting the projecting end of said slide to the end of said bar at the side of said slide remote from the anvil and a roller pivotally supported at the end of said link adjacent to said surface to bear against said surface; means operable to cause descent of the nail punch and move said slide into said guideway thus forcing the projecting end of said bar laterally away from the anvil; and spring means arranged to urge said bar into the opposite direction.

13. A nailing machine including a work supporting anvil; a nail punch arranged to descend upon said anvil; a nail point clinching mechanism contained in said anvil and operable by a pull exerted in a direction transversely of the anvil; an actuating mechanism for said nail clinching mechanism comprising a member forming a first immovable vertical outer surface laterally adjacent a side of said anvil and a second immovable vertical outer surface projecting laterally from said anvil side at right angles to said first surface, a drawbar operatively connected to the clincher mechanism and extending transversely of the anvil with one end projecting disposed parallel and adjacent to said second surface, an actuating slide received in a guideway formed in said member and extending inwardly from said second surface thereof with the projecting end of said slide disposed parallel and adjacent to said first surface, a link pivotally connecting the projecting ends of said bar and said slide at the side of said slide remote from said first surface, a roller pivotally supported at the end of said link adjacent to said second surface to bear against said second surface, and a second roller pivotally supported from the projecting end of said slide to bear against said first surface; means operable to cause descent of the nail punch and move said slide into said guideway thus forcing the projecting end of said bar away from said first surface; and spring means arranged to urge said bar into the opposite direction.

14. A nailing machine including an anvil having a work supporting upper surface; a nail punch operable to descend upon said anvil; a nail point clinching mechanism in an opening in the work supporting anvil surface in vertical alignment with said punch and comprising a plate forming a segment of said work supporting anvil surface; and means operable to elevate said plate temporarily to the level of said work supporting anvil surface including a drawbar extending transversely of said anvil to protrude laterally beyond one side thereof; an actuating mechanism operable to move said drawbar in a manner effective to elevate said plate comprising a member forming an immovable vertical surface projecting laterally from the mentioned side of said anvil adjacent and parallel to the projecting end of said drawbar and a guideway extending inwardly from said vertical surface, an actuating slide received within said guideway, a link pivotally connecting the free ends of said drawbar and said slide, and a roller pivotally supported from the end of said link adjacent said vertical surface to bear against said surface; and means operable to force said slide into said guideway to raise said plate to the level of said work supporting anvil surface and cause descent of said punch upon said anvil surface.

15. A nailing machine including an anvil having a work supporting surface; a nail punch operable to descend upon said anvil surface; a nail point clinching mechanism arranged in an opening in said anvil surface in vertical alignment with said punch and comprising a plate forming a segment of said work supporting anvil surface, a support disposed at the lower end of said opening, a roller upon said support operable to roll in a direction transversely of the anvil, a link pivotally supporting said plate from and above said roller, means blocking movement of said plate in a direction transversely of said anvil, said link being normally in a tilted position wherein it supports said plate at a level below the work supporting anvil surface, and a drawbar engaging the lower end of said link and extending transversely of said anvil to protrude laterally beyond one side thereof; an actuating mechanism operable to move said drawbar in a manner effective to straighten said link and thus raise said plate to the level of said work supporting anvil surface comprising a member forming an immovable vertical outer surface projecting laterally from the mentioned side of said anvil adjacent and parallel to the projecting end of said drawbar and a guideway extending inwardly from said outer surface, a slide bracket received within said guideway, a link pivoted to the projecting ends of said drawbar and of said bracket, a roller pivotally supported from said link to bear against said surface, camming means operable to force said bracket into said guideway, spring means opposing the resultant movement of said bracket and said drawbar, and means manually adjustable to urge said bracket into said guideway into a position out of reach of said camming means and with said plate raised to the level of said work supporting anvil surface.

16. A nailing machine including an anvil having a work supporting upper surface; a nail punch operable to descend upon said anvil surface; a nail point clinching mechanism arranged in an opening in said anvil surface in vertical alignment with said punch and comprising a plate forming a segment of said work supporting anvil surface, a support disposed at the lower end of said opening, a roller upon said support operable to roll in a direction transversely of the anvil, a link pivotally supporting said plate from and above said roller, means blocking movement of said plate in a direction transversely of said anvil, said link being normally in a tilted position wherein it supports said plate at a level below the work supporting anvil surface, and a drawbar engaging the lower end of said link and extending transversely of said anvil to protrude laterally beyond one side thereof; and an actuating mechanism operable to move said drawbar in a manner effective to straighten said link and thus raise said plate to the level of said work supporting anvil surface comprising a member forming a first immovable vertical surface adjacent said anvil side, a second immovable vertical surface projecting laterally from the mentioned side of said anvil adjacent and parallel to the projecting end of said drawbar and at right angles to said first surface, and a pair of guideways extending inwardly from said first surface, a U-shaped bracket with its two parallel shanks straddling the projecting end of said drawbar and slidably received within said guideways, links pivotally connected to the projecting end of said drawbar and the shanks of said bracket, rollers pivotally supported from the ends of said links adjacent said second surface to bear against said second surface, rollers pivotally supported from the shanks of said bracket to bear against said first surface, camming means operable to force said bracket into said guideways, and spring means opposing the resultant movement of said bracket and said drawbar.

17. In a nailing machine having a descending nail punch, a frame forming a work supporting table surface containing a recess in alignment with the nail punch, a nail point clinching member slidably disposed within said recess, said member being supported from said frame in a position with its nail point clinching surface normally disposed below the work supporting surface of said frame, means including a reciprocable bar and actuating means therefor operative coincident with the descent of the nail punch to temporarily elevate said nail point clinching surface into substantially flush relation with said work supporting table surface, and adjustable means for varying the relationship of said bar and said actuating means to alter the effective amplitude of the clinching stroke of said nail point clinching member.

18. In a nailing machine, in combination, a work supporting table containing a recess, a nail point clinching mechanism mounted on said table including a nail point clinching member slidably disposed within said recess with its nail point clinching surface normally disposed below the work supporting surface of said table, means operative to elevate said nail point clinching surface into substantially flush relation with the work supporting surface of said table, and means for varying the amplitude of the clinching stroke of said nail point clinching member.

19. In a nailing machine, in combination, a work supporting table containing a transversely disposed guideway and a vertical recess, a nail point clinching mechanism mounted for reciprocative movement within said guideway and including a nail point clinching member slidably disposed within said vertical recess with its nail point clinching surface normally disposed below the work supporting surface of said table, and means operative to reciprocate said clinching mechanism in a manner effective to elevate the nail point clinching surface of said clinching member into substantially flush relation with the work supporting surface of said table, said operative means including a reciprocable bar operably coupled to said clinching member, an actuator for said bar reciprocable in a stroke of predetermined amplitude, and means carried by said actuator and operatively associated with said bar to transmit motion of said actuator to said bar, said transmitting means being adjustable to regulate the distance through which said bar is moved by said actuator.

20. In a nailing machine, in combination, a nail point clinching mechanism, an actuating slide for said clinching mechanism, means normally acting upon and cooperating with said actuating slide to move it to actuate said clinching mechanism, and means operable in a manner effective to withdraw said actuating slide out of reach of said first mentioned means and thus render said nail point clinching mechanism inactive.

21. In a nailing machine, in combination, a work support, a nail point clinching mechanism mounted for movement relative to said work support, a nail point clinching member mounted for reciprocation relative to said work support and said clinching mechanism, an actuating slide mounted for reciprocation relative to said work support, means for interconnecting said clinching mechanism and said slide, camming means normally cooperating with said slide for moving the latter to effect actuation of said clinching mechanism and advancement of said nail point clinching member into its nail clinching position, and means operable in a manner effective to withdraw said actuating slide out of reach of said camming means and thus render said clinching mechanism inactive while said clinching member is in its advanced nail clinching position.

22. A combination as defined in claim 21, in which the actuating slide is disposed substantially in perpendicular relation to the nail point clinching mechanism and in the operative plane of the camming means.

23. A nailing machine comprising a frame, nail driving mechanism mounted upon said frame, a work supporting table mounted for adjustment relative to said frame and to said nail driving mechanism, a clinching anvil mounted for reciprocation relative to said work supporting table, operating mechanism for said nail driving mechanism and said anvil mounted upon said frame, and means operable in a manner effective to move said work supporting table with said clinching anvil beyond the range of said anvil operating mechanism to permit utilization of said nail driving mechanism and said work supporting table for types of work which do not require clinching and subsequently to return said work supporting table with said clinching anvil into the range of said operating mechanism for resumption of nail clinching operations.

24. In a nailing machine, the combination with nail driving mechanism, of a work support for holding work while nails are driven thereinto, a clinching anvil, and mechanism operating in timed relation with said nail driving mechanism for operating said anvil, said operating mechanism including a cam having a portion for maintaining the anvil normally below the work supporting surface of said work support while work is being inserted in said machine, a second portion for elevating said anvil into substantially flush relation with said work supporting surface while a nail is being driven so as to clinch the point of said nail coincident with its projection through the work, and a third portion for permitting rapid return of the anvil to its normally retracted position.

References Cited in the file of this patent

UNITED STATES PATENTS

| Number | Name | Date |
| --- | --- | --- |
| 392,106 | Clark | Oct. 30, 1888 |
| 587,321 | Morgan | Aug. 3, 1897 |
| 593,232 | McAllister et al. | Nov. 9, 1897 |
| 861,382 | Milliken | July 30, 1907 |
| 908,243 | Gminder | Dec. 29, 1908 |
| 1,842,796 | Morgan | Jan. 26, 1932 |
| 1,903,700 | Kruse | Apr. 11, 1933 |